United States Patent [19]
Champeau

[11] Patent Number: 6,124,828
[45] Date of Patent: Sep. 26, 2000

[54] ANTI-JAMMING ARRAY ANTENNA

[75] Inventor: André Champeau, Orsay, France

[73] Assignee: Thomson-CSF, Paris, France

[21] Appl. No.: 09/111,282

[22] Filed: Jul. 7, 1998

[30] Foreign Application Priority Data

Jul. 8, 1997 [FR] France .................................. 97 08668

[51] Int. Cl.[7] ................................ G01S 3/16; G01S 3/28; H01Q 3/26; H01Q 21/08; H04K 3/00
[52] U.S. Cl. .............................. 342/379; 342/16; 342/17; 342/368; 343/824
[58] Field of Search .................................... 342/378, 368, 342/379, 16, 17, 19; 343/824; 367/119, 124, 125, 126

[56] References Cited

U.S. PATENT DOCUMENTS

| 4,291,310 | 9/1981 | Kruger . |
| 4,596,986 | 6/1986 | Andrews et al. . |
| 5,068,632 | 11/1991 | Champeau . |
| 5,084,708 | 1/1992 | Champeau et al. . |
| 5,343,211 | 8/1994 | Kott . |
| 5,675,343 | 10/1997 | Champeau . |

FOREIGN PATENT DOCUMENTS

| 0 474 977 | 3/1992 | European Pat. Off. . |
| 0 651 461 | 5/1995 | European Pat. Off. . |

OTHER PUBLICATIONS

A. Farina, et al., "Wide Deterministic Nulling By Means Of Multiplicative Array Techniques," Conference Proceedings Of The 11th European Microwave Conference, (Sep. 7–11, 1981), pp. 805–812.

Primary Examiner—Thomas H. Tarcza
Assistant Examiner—Fred H. Mull
Attorney, Agent, or Firm—Oblon, Spivak, McClelland, Maier & Neustadt, P.C.

[57] ABSTRACT

This array antenna with anti-jamming in reception for radio-electrical or ultrasound waves is provided with radiating elements fitted out individually or in groups with amplitude-controlled and phase-controlled passive or active modules enabling aiming at transmission as well as at reception by analog beam-forming. It possesses a reception anti-jamming circuit carrying out successively two reduced, adaptive computational beam-forming operations, one in elevation which is performed on a grouping, in horizontal alignments, of the reception signals of the radiating elements and working on the reception signals by modifying the settings of the controlled modules and the other in relative bearing, performed on a grouping, in vertical alignments, of the signals of the radiating elements that which it phase-shifts and adds up to form a reception channel for the total antenna. The reception anti-jamming thus obtained has performance characteristics comparable to those that would result from a full adaptive beam-forming operation. At the same time, it requires a far smaller volume of processing.

7 Claims, 2 Drawing Sheets

ANTI-JAMMING ARRAY ANTENNA

BACKGROUND OF THE INVENTION

1. Field of the Invention

The present invention relates to an array type antenna for radioelectrical or ultrasound waves, protected against jamming in reception. This antenna has radiating elements or groups of radiating elements individually fitted out with active or passive amplitude-controlled and phase-controlled modules enabling an aiming operation, at both transmission and reception, by analog beam-forming, and adaptive computational beam-forming means carrying out reception anti-jamming.

2. Description of the Prior Art

Hereinafter, amplitude-controlled and phase-controlled active or passive modules shall be simply called controlled modules, purely with a view to simplification.

An array antenna consists of an assembly of radiating elements distributed in an array, most usually a surface array, with a mesh size of about $\lambda/2$, i.e. half of the wavelength of the radiation transmitted or received, to prevent the appearance of array lobes that disturb the directivity of the antenna.

The sizing of an antenna is a function of the amplitude of the signal to be received, namely of the signal-to-noise ratio desired at reception and the desired angular resolution.

In most cases, the signals to be received are characterized by a uniform surface density of power at the place of reception so that the power of the useful signal received increases as the useful surface area of the antenna.

The angular resolution for its part is defined in each direction by the linear dimension L of the antenna in the direction considered related to the wavelength $\lambda$ in the relationship $\lambda/L$, the solid angle resolution being defined in the ratio $\lambda^2/S$, where S is the surface area of the antenna.

In practice, the requirement of fineness of angular resolution is more difficult to meet than that of a high signal-to-noise ratio. Hence, if no compromise is accepted, the end result is an excessive number of radiating elements. Since, for reasons of cost, it is sought to limit the number of radiating elements of an array antenna to the utmost extent, it is worthwhile to curb this excess number by leaving gaps in the meshwork of radiating elements on the surface of an array antenna. The array antenna is then said to be a thinned array or a sparse array depending on whether the number of missing radiating elements is smaller than or greater than the number of radiating elements present.

In a thinned array or sparse array antenna, the absence of certain radiating elements means that the mesh size of about $\lambda/2$ no longer prevails. This leads to the appearance of array lobes if the arrangement of the missing radiating elements is periodic or to the appearance of scattered lobes if this arrangement is random. It is important to reduce these array lobes and scattered lobes to the utmost possible extent.

An array antenna may have mechanical aiming or electronic aiming. When the aiming is electronic, it is done at transmission by an analog beam-forming operation whereas at reception it may be done either by an analog beam-forming operation or by a computational beam-forming operation.

Analog beam-forming requires that the radiating elements of the antenna or groups of radiating elements should be fitted out individually with amplitude-controlled and phase-controlled active or passive elements used to orient the plane of the waves transmitted or received in the desired direction. Analog beam-forming has the advantage of working both in transmission and in reception. If necessary, an amplitude control or a distribution array enables an amplitude weighting operation.

Computational beam-forming consists in digitizing the signals received by each of the radiating elements after they have been demodulated coherently and then in phase-shifting them individually and taking a weighted sum thereof by computer to orient the plane of the received waves in the desired direction. It has the advantage of providing great flexibility to the beam-forming operation since, by computation, it is possible to simultaneously form several beams aiming in different directions. When it is adaptive, it furthermore enables the performance of anti-jamming operations by adjustment of the positions of the zeros in the radiation pattern. However, it has the disadvantage of not being usable at transmission, requiring costly equipment for the digitization of the signals of the radiating elements and requiring a very large number of computation operations.

To limit the cost of a computational beam-forming operation, the idea has arisen of dividing the array of the antenna into sub-arrays and carrying out the computational beam-forming operation in a reduced form not on individual signals of the radiating elements but on signals delivered individually by sub-array groupings of the radiating elements. The mesh size of the antenna at about $\lambda/2$ is no longer maintained. This leads to the appearance of array and/or scattered lobes so that the reduced beam-forming leads to poor performance characteristics of the antenna on a wide angular field. However, it remains interesting, in its adaptive form, for specific angular anti-jamming operations for, in order that such operations may be efficient, it is not necessary for the beam-forming operation to cover a large number of reception signals.

Given these considerations and owing to the fact that an array antenna is often used both at transmission and at reception, it is usual to fit out the radiating elements of an array antenna, individually or by groups, with controlled modules enabling an operation of aiming by analog beam-forming, and to assemble, in reception, the radiating elements of the antenna into sub-arrays to carry out an anti-jamming operation by a reduced adaptive computational beam-forming operation, the radiating elements being assembled in reception into surface sub-arrays and the reduced adaptive computational beam-forming operation being done in both directions of aim, relative bearing and elevation.

The reduced adaptive computational beam-forming operation generates a radiation pattern whose major lobe preserves the aiming direction produced by the controlled modules but whose zeros are shifted towards the jammers. This is done chiefly by playing on the relative amplitudes and, possibly, on a secondary basis, by bringing into play the relative phase shifts dictated on the reception signals of the sub-arrays. With the total energy being preserved, this radiation diagram retains the drawback of having array lobes with discrete angular positions or scattered lobes depending on whether the organization of the surface sub-arrays in the antenna is periodic or random, for the sub-arrays necessarily have phase centers that are spaced out by a distance greater than or equal to $\lambda$ expressing a sub-sampling of the surface of the antenna.

To limit this drawback, it has been proposed in the U.S. Pat. No. 5,675,343 filed by the present Applicant to perform an aiming operation, on an array antenna, by analog beam-forming. This operation is complemented by an operation of anti-jamming in reception by means of two reduced computational beam-forming operations applied to the reception signals of the radiating elements fitted out with controlled modules, assembled in two sets of parallel linear sub-arrays oriented in two different directions, and by means of a non-linear combination of the two reception signals resulting from the two reduced computational beam-forming operations. This procedure leads to a reduction in the disturbances that come in through the minor lobes, and especially through the array lobes in the case of a thinned antenna. However, the non-linear processing of the grouping of the reception signals resulting from the two reduced computational beam-forming operations may generate intermodulation products if several signals are present in the same range gate of one and the same angular cell: for example a target signal and a clutter signal. This drawback may be circumvented by a Doppler filtering upline with respect to the grouping of the two reception signals resulting from the reduced computational beam-forming operations, but this means that it is necessary to double the Doppler filtering equipment.

An aim of the present invention is an array antenna with aiming by analog beam-forming and anti-jamming at reception by means of reduced adaptive computational beam-forming operations leading to a low level of the minor lobes or scattered lobes, whether this array antenna is a full, thinned or sparse array antenna.

SUMMARY OF THE INVENTION

An object of the invention is an array antenna with anti-jamming in reception, provided with radiating elements fitted out individually or in groups with amplitude-controlled and phase-controlled passive or active modules enabling aiming at transmission as well as at reception by analog beam-forming and with a reception anti-jamming circuit comprising:

first reduced adaptive computational beam-forming means working on reception signals coming from the controlled modules and assembled in a first manner in linear sub-arrays parallel to a first direction, determining corrections to be dictated on the reception signals coming from the different linear sub-arrays taken into account to eliminate jammers and applying these corrections to the controlled modules, and second reduced adaptive computational beam-forming means working on reception signals coming from the controlled modules, and assembled in a second manner in linear sub-arrays parallel to a second direction, determining corrections to be dictated on the reception signals coming from the different sub-arrays taken into account to eliminate jammers, dictating these corrections on the reception signals coming from the different sub-arrays taken into account before added them up to form a reception channel for the total antenna.

Thus, the anti-jamming in reception of an array antenna with electronic aiming by analog beam-forming is achieved by means of two reduced adaptive computational beam-forming operations giving the antenna a reduced processing load as compared with that of a full adaptive computational beam-forming operation using reception signals delivered individually by the controlled modules connected to the radiating elements of the antenna. At the same time, a comparable reduction is provided of the disturbances entering by the minor lobes and array lobes.

Advantageously, the directions of the two sets of linear sub-arrays are orthogonal and oriented, one along the elevation angle plane and the other along the relative bearing plane of the array antenna.

BRIEF DESCRIPTION OF THE DRAWINGS

Other features and advantages of the invention shall appear from the following description of an embodiment given by way of an example. This description shall be made with reference to the appended figures, of which.

MORE DETAILED DESCRIPTION

Figure 1:
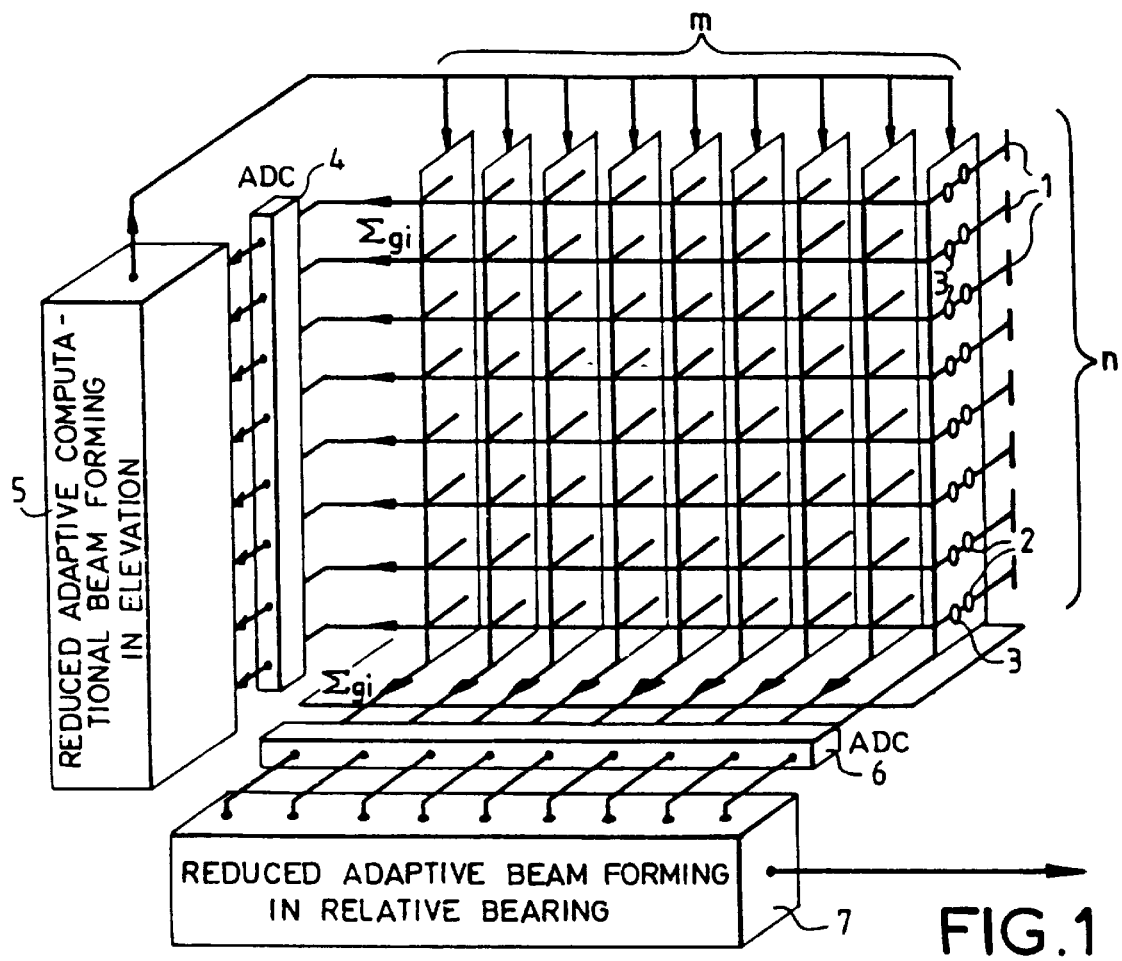
FIG. 1 gives a schematic view of an anti-jamming array antenna according to the invention.

FIG. 1 shows a flat array antenna bringing together a number of radiating elements 1 uniformly distributed on m columns and n rows in a mesh of about $\lambda/2$ ($\lambda$ being the wavelength of use of the antenna) to meet the surface sampling criterion that ensures the absence of array lobes in the case of wide angle electronic scanning. Each radiating element 1 is individually fitted out with a controlled phase-shifter module 2 complemented by a controlled attenuator module 3.

It is possible, with a view to simplifying the configuration of the antenna, to have several radiating elements of the antenna served by one and the same controlled module 2.

The controlled modules 2 and 3 are controlled primarily by the antenna aiming circuit (not shown) which brings about the orientation, both at transmission and at reception, of the wave plane of the antenna in the desired direction in relative bearing and in elevation, in bringing into play essentially the phases and, on an accessory basis, the levels of the signals of the different radiating elements to model the shape of the lobe or lobes.

In reception, the outputs of the controlled modules 2, 3 are the object of two groupings: a first grouping in n horizontal alignments of m elements parallel to the relative bearing axis and a second grouping in m vertical elements of n elements parallel to the elevation angle axis. These two groupings are obtained by means of two crossed and superimposed sets of distributors. These distributors divide the reception signal available at output of a controlled module 2, 3 into a first component and a second component that are available in parallel. They bring together, firstly, the first component with the first components coming from the other controlled modules 2, 3 belonging to the same horizontal alignment to form a reception signal $\Sigma_{gi}$, and, secondly, the second component with the second components coming from the other controlled modules belonging to the same vertical alignment to form a reception signal $\Sigma_{si}$. The reception signal $\Sigma_{gi}$ of all the horizontal alignments of radiating elements 1 are applied by means of a bank 4 of analog-digital converters to a first reduced adaptive computational beam-forming circuit 5 preparing correction commands for the controlled modules 2, 3. These correction commands are the secondary commands that that get added to the commands prepared by the aiming circuit. The reception signals $\Sigma_{si}$ of all the vertical alignments of radiating elements 1 are applied by means of another bank 6 of analog-digital converters to a second reduced adaptive computational beam-forming circuit 7 forming a reception channel for the total antenna.

The first reduced adaptive computational beam-forming circuit 5 analyzes the disturbances in elevation of the wave plane received by the array antenna and deduces therefrom the corrections to be made to the commands prepared by the aiming circuit for the different controlled modules 2, 3 to attenuate the detected disturbances. It enables the creation, in the radiation pattern at reception of the array antenna, of crevices in elevation having the shape of horizontal valleys to eliminate the disturbing signals offset in elevation with respect to the aiming axis of the antenna.

The second reduced adaptive computational beam-forming circuit 7 analyses the disturbances in relative bearing of the wave plane received by the array antenna. It deduces therefrom the amplitude and phase corrections to be made to the reception signals of the vertical alignments of radiating elements 1 to attenuate the disturbances detected before adding up these reception signals to generate a total reception signal of the array antenna. It enables the creation, in the radiation pattern of the array antenna, at reception, of crevices in relative bearing having the shape of vertical valleys to eliminate the disturbing signals offset in relative bearing with respect to the aiming axis of the array antenna.

The first and second reduced adaptive computational beam-forming circuits 5 and 7 shall not be described here in detail because they form part of the usual technique of anti-jamming by means of an adaptive computational beam-forming operation based on the search for corrections of levels and, to a lesser extent of phase, of the reception signals brought into play in order to minimize the power of the total reception signal in accordance with the assumption according to which the disturbing signals to be eliminated have a power generally greater than that of the useful signal and come from a direction at least slightly different from that of the direction of aim of the array antenna.

Figure 2:
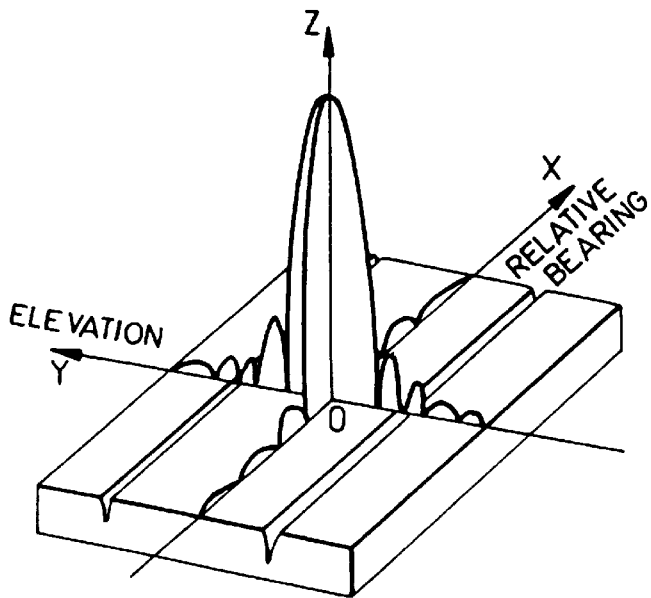
FIG. 2 shows the effect, on the reception radiation pattern of an array antenna, of the circuit for reduced adaptive beam-forming in elevation used in the array antenna subjected to anti-jamming of FIG. 1.
Figure 3:
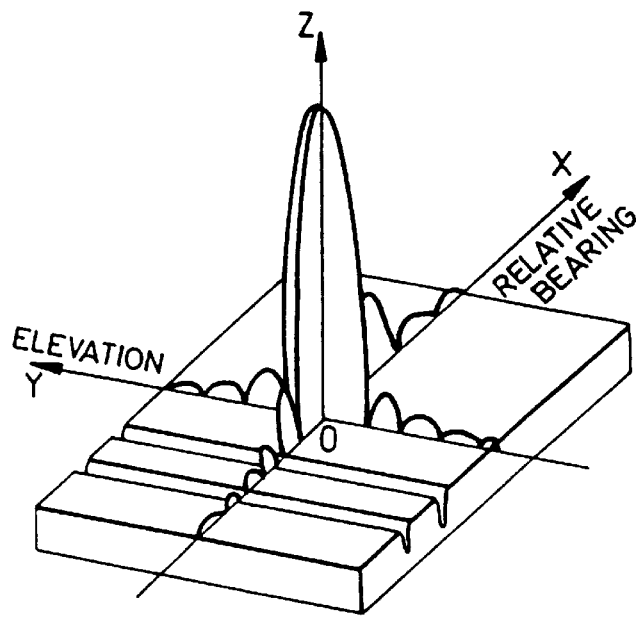
FIG. 3 shows the effect, on the reception radiation pattern of an array antenna, of a circuit for reduced adaptive beam-forming in relative bearing, used in the array antenna subjected to anti-jamming of FIG. 1.
Figure 4:
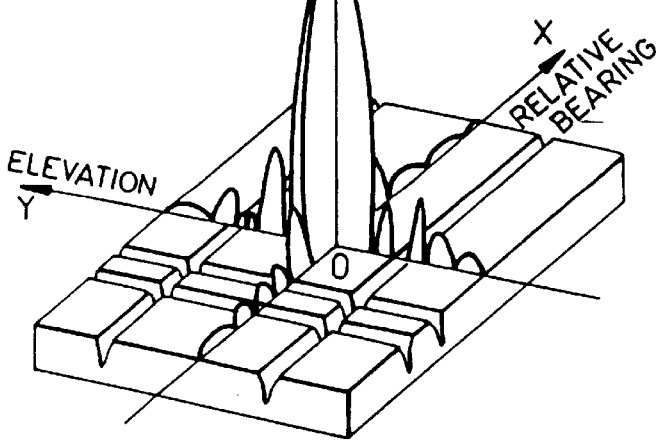
FIG. 4 shows the combined effects, on the reception radiation pattern of an array antenna, of the two circuits for reduced adaptive beam-forming in elevation angle and in relative bearing used in the array antenna subjected to anti-jamming of to FIG. 1.

FIGS. 2, 3 and 4 show a direct reference dihedron with an axis OX graduated in angles of relative bearing, an axis OY graduated in angles of elevation and an axis OZ graduated in terms of signal level. By means of this dihedron, these figures plot sections along the planes XOZ and YOZ of the radiation pattern surfaces of the array antenna obtained for operation in reception, respectively, in the case of the implementation of only the first circuit 5 for reduced adaptive beam-forming in elevation, the implementation of only the circuit 7 for reduced adaptive beam-forming in relative bearing and the combined implementation of the first circuit 5 and the second circuit 7 for reduced adaptive beam-forming in elevation and in relative bearing.

FIG. 2 shows the radiation pattern obtained for the array antenna working in reception only with the first reduced adaptive computational beam-forming circuit 5 working on the reception signals of the horizontal alignments of radiating elements 1 fitted out with controlled modules 2, 3. It has a thin major lobe oriented in the aiming direction determined by the rough settings of the controlled modules 2, 3 dictated by the aiming circuit, and minor lobes. The minor lobes have smaller amplitudes in the relative bearing plane XOZ for the reduced beam-forming operation is based on full horizontal alignments. They have amplitudes that are more pronounced in the elevation plane YOZ but with interposed zeros having the form of valleys parallel to the relative bearing axis and positions in elevation that are adjustable by the adaptive action of the reduced beam-forming operation.

FIG. 3 shows the radiation pattern obtained for the array antenna working in reception with only the second reduced adaptive computational beam-forming circuit 7 delivering the total reception signal of the array antenna. It has a thin major lobe oriented in the aiming direction determined by the rough settings of the controlled modules 2, 3 dictated by the aiming circuit, and minor lobes. The minor lobes have smaller amplitudes in the elevation angle plane YOZ for the reduced beam-forming operation is based on full vertical alignments. They have amplitudes that are more pronounced in the relative bearing plane XOZ but with interposed zeros having the form of valleys parallel to the elevation angle axis and positions in relative bearing that are adjustable by the adaptive action of the reduced beam-forming operation.

FIG. 4 shows the radiation pattern obtained for the array antenna working in reception mode following the combination of the actions of the two reduced adaptive beam-forming circuits 5 and 7. The adaptive actions of the two successive beam-forming operations, one in the elevation angle plane and the other in the relative bearing plane, results in the creation of crevices in the form of valleys, some of which are parallel to the relative bearing axis while others are parallel to the elevation angle axis, each crevice using up only one degree of freedom in a single reduced adaptive beam-forming operation.

It will be noted that the successive use, for anti-jamming in reception, of two reduced adaptive computational beam-forming operations relating to two groupings in orthogonal alignments of the radiating elements of the antenna, one acting upline on the controlled modules of the radiating elements and the other providing a downline total reception signal of the array antenna, makes it possible, from the viewpoint of the minor lobes, to arrive at a result close to that of a complete adaptive computational beam-forming operation. At the same time it allows for a sufficient number of degrees of freedom (m-1)+(n-1) to eliminate jammers and requires far smaller processing capacities since the reduced adaptive computational beam-forming operations now relate to only m+n points instead of m×n points.

Figure 5:
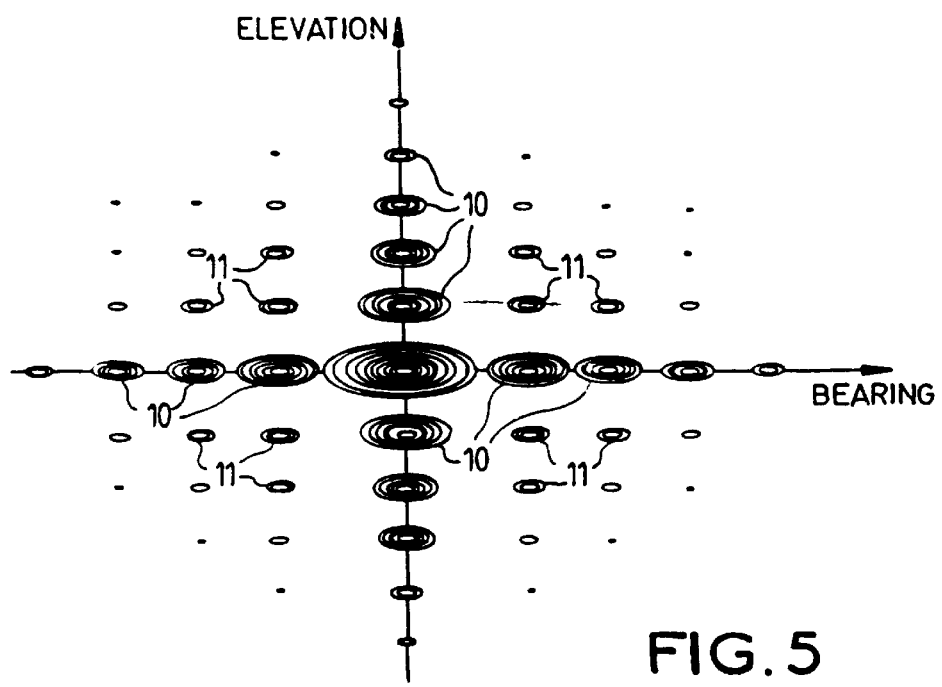
FIG. 5 is a graph illustrating the positioning, in the elevation angle and relative bearing plane, of the side lobes of the radiation pattern of an array antenna with respect to the major lobe.

The fact that the zeros or crevices created by the two reduced adaptive computational beam-forming processing operations are in the shape of valleys and not wells is an advantage if we consider the shape of the ambiguity pattern of an antenna with illumination separated in elevation angle and in relative bearing. Indeed, as shown in FIG. 5, the minor lobes are constituted, in decreasing amplitudes, by side lobes 10 that are distributed around the major lobe, in alignments along the main elevation angle and relative bearing axes, and side lobes 11 that are distributed in a checkerboard pattern. Since, except for the major lobe, it is on the side lobes that any disturbances are perceived to the greatest extent, adaptive zeros taking the shape of valleys are particularly suited to aligned arrangements of the minor lobes.

Since the amplitude and phase corrections prepared by the first reduced adaptive beam-forming circuit are implemented by actions on the controlled modules of the radiating elements, a certain lapse of time, which is very short, is needed to change the states of the controlled modules. The time taken to compute the corrections is not added to this lapse of time but, contrary to a standard reduced adaptive beam-forming operation, the processing cannot be applied to temporarily memorized signals without interrupting the flow of incident signals. It is therefore necessary to accept a neutralization of reception time intervals for the refreshing, when necessary, of the settings of the controlled modules. To avoid periodic and systematic neutralization periods, it is possible to use the function of analysis of the first reduced adaptive computational beam-forming operation to monitor the disturbances and their progress and interrupt the reception only when it proves necessary to significantly modify the settings of the controlled modules. With the speed of currently available computation means and that of the microwave electronic circuitry of active antenna modules, it is possible to limit the interruption of reception for the updating of the corrections to one range gate. In the case of an array antenna for pulse radars, it is possible to minimize the effects of this constraint by locating the refreshing of the corrections on the same settings of the controlled modules at the beginning of the recurrence.

It can be seen that it is possible to duplicate the second reduced adaptive computational beam-forming circuit 7 one or more times so as to have available, from the same antenna, several reception channels aiming in different directions in relative bearing. Each copy of the second reduced adaptive computational beam-forming circuit 7 is then affected, primarily, by a particular set of complex weighting coefficients adapted to the desired direction of aim in relative bearing.

A description has been given of an array antenna that successively implements, for anti-jamming operations, two reduced adaptive computational beam-forming operations. These two beam-forming operations are a first hybrid operation acting upline on the settings of the controlled modules of the radiating elements of the antenna and working by means of a grouping, by horizontal alignments, of the radiating elements of the antenna and a second purely digital beam-forming operation delivering a downline total reception signal of the array antenna and working by means of a grouping, by vertical alignments, of the radiating elements of the antenna. It is equally well possible to obtain the first hybrid reduced adaptive beam-forming operation by means of a grouping by vertical elements of the radiating elements of the antenna and the second purely digital reduced adaptive beam-forming operation by means of a grouping, by horizontal alignments, of the radiating elements of the antenna. It must be noted however that the former version is preferable in practice. Indeed, disturbances by deliberate or accidental jamming very generally have a stationary character that is longer in elevation angle than in relative bearing. It is therefore preferable that the first reduced adaptive beam-forming hybrid processing operation, which requires very short interruptions of reception for the modifications of settings of the controlled modules, should be located on the elevation angle axis for, in this case, these interruptions are even less frequent.

The adaptive corrections applied to the controlled modules can correspond to only one solution for a single formed lobe. Those applied digitally may be parallel solutions applied to multiple lobes. The result thereof, for a solution with parallel multiple lobes, is that these lobes can be formed only in the plane where the adaptive beam-forming is entirely digital.

The array antenna that has just been described is a full array antenna. It could obviously be thinned or sparse. In this case, when there are no disturbances, the two reduced adaptive computational beam-forming operations that are done successively leave any array lobes or scattered lobes, due to thinness or sparseness, in their state whereas when there are disturbances, the crevices or adapted zeros created are those of an adaptive computational beam-forming operation in the environment of scattered lobes or side lobes of the antenna as it is.

A typical application of the array antenna with anti-jamming in reception that has just been described is thus that of an array antenna for a 3D (elevation angle, relative bearing, range) radar. For a major lobe of the radiation pattern having an aperture of 20° in elevation angle and 1.5° in relative bearing, the array antenna must have approximately 80 columns of 54 radiating elements giving a total of about 4,320 radiating elements. With an array antenna of this kind, the anti-jamming processing operation in reception is obtained successively by the first reduced adaptive hybrid beam-forming operation acting on the controls of the controlled modules of the radiating elements, which has 54 moments in elevation angle, and by the second purely digital reduced adaptive beam-forming operation delivering a total reception signal, which has 80 moments in relative bearing. Since the number of degrees of freedom is (54-1)+(80-1), the reception anti-jamming function is capable in principle of coping with 132 jammers. This provides for a wide operational margin. It is furthermore noted that a great saving in processing is obtained as compared with a full adaptive computational beam-forming operation since the two reduced adaptive beam-forming operations relate to only 54 and 80 points instead of 4,320.

What is claimed is:

1. An array antenna with anti-jamming in reception, provided with radiating elements fitted out individually or in groups with amplitude-controlled and phase-controlled passive or active modules enabling aiming at transmission as well as at reception by analog beam-forming, and with a reception anti-jamming circuit comprising:

first reduced adaptive computational beam-forming means working on reception signals coming from said controlled modules and assembled in a first manner in linear sub-arrays parallel to a first direction, determining corrections to be dictated on the reception signals coming from the different linear sub-arrays taken into account to eliminate jammers and applying these corrections to the controlled modules, and second reduced adaptive computational beam-forming means working on reception signals coming from the controlled modules, and assembled in a second manner in linear sub-arrays parallel to a second direction, determining corrections to be dictated on the reception signals coming from the different sub-arrays taken into account to eliminate jammers, dictating these corrections on the reception signals coming from the different sub-arrays taken into account before added them up to form a reception channel for the total antenna.

2. An antenna according to claim 1, wherein said second reduced, adaptive computational beam-forming means are duplicated at least once and, at each duplication, are assigned different sets of complex weighting coefficients so as to form several reception channels aiming in different directions.

3. An antenna according to claim 1, wherein the directions of the linear sub-arrays of the two groupings of reception signals on which the first and second reduced, adaptive computational beam-forming means operate are orthogonal to each other.

4. An antenna according to claim 3, wherein the direction of the linear sub-arrays of one of the groupings is horizontal while that of the linear sub-arrays of the other grouping is vertical.

5. An antenna according to claim 4, wherein the direction of the linear sub-arrays of the grouping of reception signals on which the first reduced, adaptive beam-forming means operate is horizontal, the direction of the linear sub-arrays of reception signals on which the second reduced, adaptive beam-forming means operate being vertical.

6. An antenna according to claim 1 that is a thinned array antenna, its array of radiating elements comprising gaps and the missing radiating elements being smaller in number than the radiating elements that are present.

7. An antenna according to claim 1 that is a sparse array antenna, its array of radiating elements comprising gaps and the missing radiating elements being greater in number than the radiating elements that are present.

* * * * *